ALUMINUM OXIDE FILMS FOR ELECTRONIC DEVICES

INVENTORS
Michael T. Duffy &
James E. Carnes
BY Glenn H. Bruestle
ATTORNEY

INVENTORS
Michael T. Duffy &
James E. Carnes
BY Glenn H. Bruestle
ATTORNEY

INVENTORS
Michael T. Duffy &
James E. Carnes
BY [signature]
ATTORNEY

INVENTORS
Michael T. Duffy &
James E. Carnes
BY Glenn H. Bruestle
ATTORNEY 3,809,574

ALUMINUM OXIDE FILMS FOR ELECTRONIC DEVICES

Michael Thomas Duffy, Princeton Junction, and James Edward Carnes, Cranbury, N.J., assignors to RCA Corporation Filed July 15, 1971, Ser. No. 162,888
Int. Cl. B44d *1/18*
U.S. Cl. 117—201 13 Claims

ABSTRACT OF THE DISCLOSURE

An improved metal-alumina-semiconductor (MAS) device includes an aluminum oxide film formed by chemical vapor phase deposition in the presence of a hydrogen halide. This film, used as a passivating layer or as a gate insulator of an IGFET, exhibits high initial dielectric breakdown strength and other properties which add stability and longer life over conventional devices.

The invention herein described was made in the course of or under a contract or subcontract thereunder with the Department of the Navy.

BACKGROUND OF THE INVENTION

This invention relates to the manufacture of semiconductor devices and more particularly to an improved method of forming aluminum oxide as a gate insulator for an IGFET or as a passivating dielectric.

DESCRIPTION OF THE PRIOR ART

Over the past several years considerable interest in thin aluminum oxide ($Al_2O_3$) for electronic device applications has been elicited. Aluminum oxide has been used as both a gate insulator and a passivating dielectric in electronic devices. This material has advantages over silicon dioxide, a more conventional material, including: higher dielectric constant, greater impermeability to impurity diffusion, and lower radiation sensitivity. Moreover, relatively low temperatures are usually required for device fabrication.

In early attempts to produce aluminum oxide for electronic device applications, problems arose in providing films with sufficiently high initial breakdown voltage levels. This has been attributed to surface defects at the semiconductor-insulator interface.

Several methods of depositing $Al_2O_3$ films have been proposed. For example, one known method involves chemical vapor deposition from organo-aluminum sources and has been described by J. A. Aboaf in the Journal of The Electrochemical Society, V. 114, 948, (1967). This method is satisfactory in that it provides a flexible process at a low deposition temperature, but does not provide sufficiently high initial dielectric strength, and does not provide any change over prior structures in the density of interface states.

SUMMARY OF THE INVENTION

In the present method aluminum oxide films are formed by chemical vapor deposition (CVD) from aluminum-containing organic compounds in an atmosphere containing hydrogen halide. The organic compound may or may not contain sufficient oxygen to support the reaction. If it does not, an oxygen-containing gas should be added to the reaction chamber. The inclusion of a hydrogen halide gas in the reaction atmosphere results in aluminum oxide films having high breakdown strengths and low interface state densities. The films are also uniform and free of areas of excessive localized conduction.

FIG. *5a* shows recorded traces of breakdown voltage vs. time for prior art samples without HCl gas present during deposition of $Al_2O_3$.

FIG. *5b* shows recorded traces of breakdown voltage vs. time for samples made with HCl gas present during deposition of $Al_2O_3$.

Figure 6:
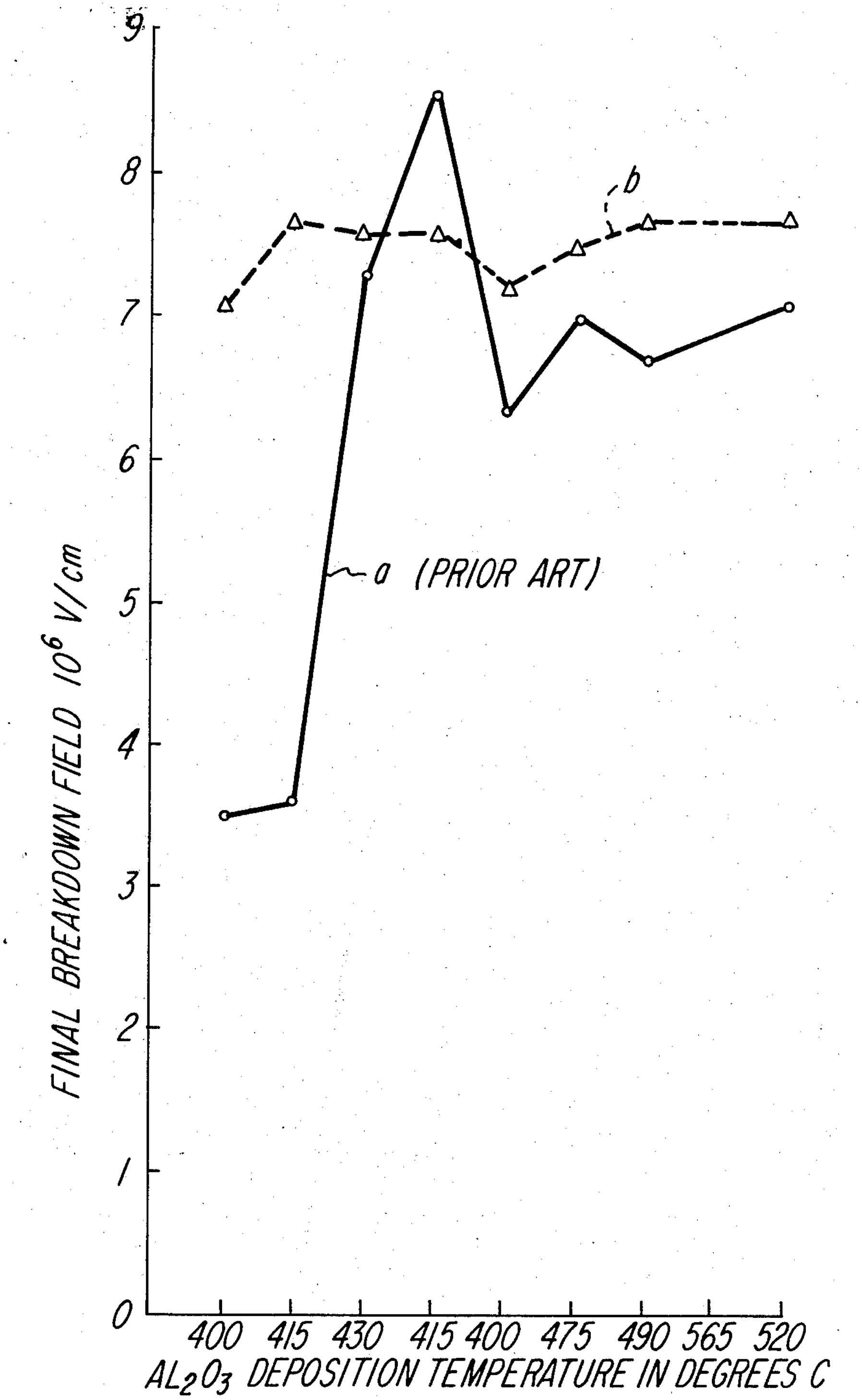

FIG. 6 is a composite graph showing the self-healing breakdown field vs. aluminum oxide deposition temperature for aluminum oxide samples deposited with and without HCl.

DESCRIPTION OF THE PREFERRED EMBODIMENTS

In generalized terms, the deposition of aluminum oxide is practiced herein from the vapor product of an aluminum-containing organic compound and the deposition is carried forward in the presence of a hydrogen halide. The aforementioned aluminum-containing organic compounds for the purposes of convenience in describing this invention are classified into two subcategories: (1) aluminum alcoholates; and, (2) organo-aluminum compounds. The members of the former group generally contain sufficient oxygen within the structure of the compound so that the reaction leading to the $Al_2O_3$ can be driven to completion without an additional source of oxygen. In the latter group, however, no oxygen or insufficient oxygen is present so an oxygen-containing gas should be added to the atmosphere in which the reaction goes forward. In working with compounds of either subcategory, the reaction is not disturbed by the addition of a small excess of oxygen-containing gas.

For the convenience of this description, any aluminum-containing organic compound which would fall into both categories, such as diethylaluminum ethoxide, will be regarded as an organo-aluminum compound merely because it is frequently necessary to add some additional oxygen-containing gas to the reaction-supporting atmosphere.

In one example of the preferred embodiments described in detail hereinafter, the process is directed to the use of aluminum isopropoxide. However, any aluminum alcoholate, the vapor phase of which may be transported to the reaction chamber, may be used. In particular, aluminum ethoxide, aluminum butoxide, aluminum methoxide, aluminum phenoxide, aluminum acetylacetonate, aluminum 2-ethylhexoxide, and aluminum cyclohexanebutyrate are suitable.

In another example of the preferred embodiments described in detail hereinafter, the process is directed to the use of trimethyl aluminum. However, any organo-aluminum, the vapor phase of which may be transported to the reaction chamber, may be used. In particular, triethyl aluminum, tripropyl aluminum, tri-isobutyl aluminum, trihexyl aluminum and diethylaluminum ethoxide are suitable.

While the preferred embodiments of the process are directed to the use of hydrogen chloride, any hydrogen halide which is not unduly disruptive to the aluminum oxide insulating layer may be employed. In particular, hydrogen bromide and hydrogen iodide are suitable.

Figure 1:
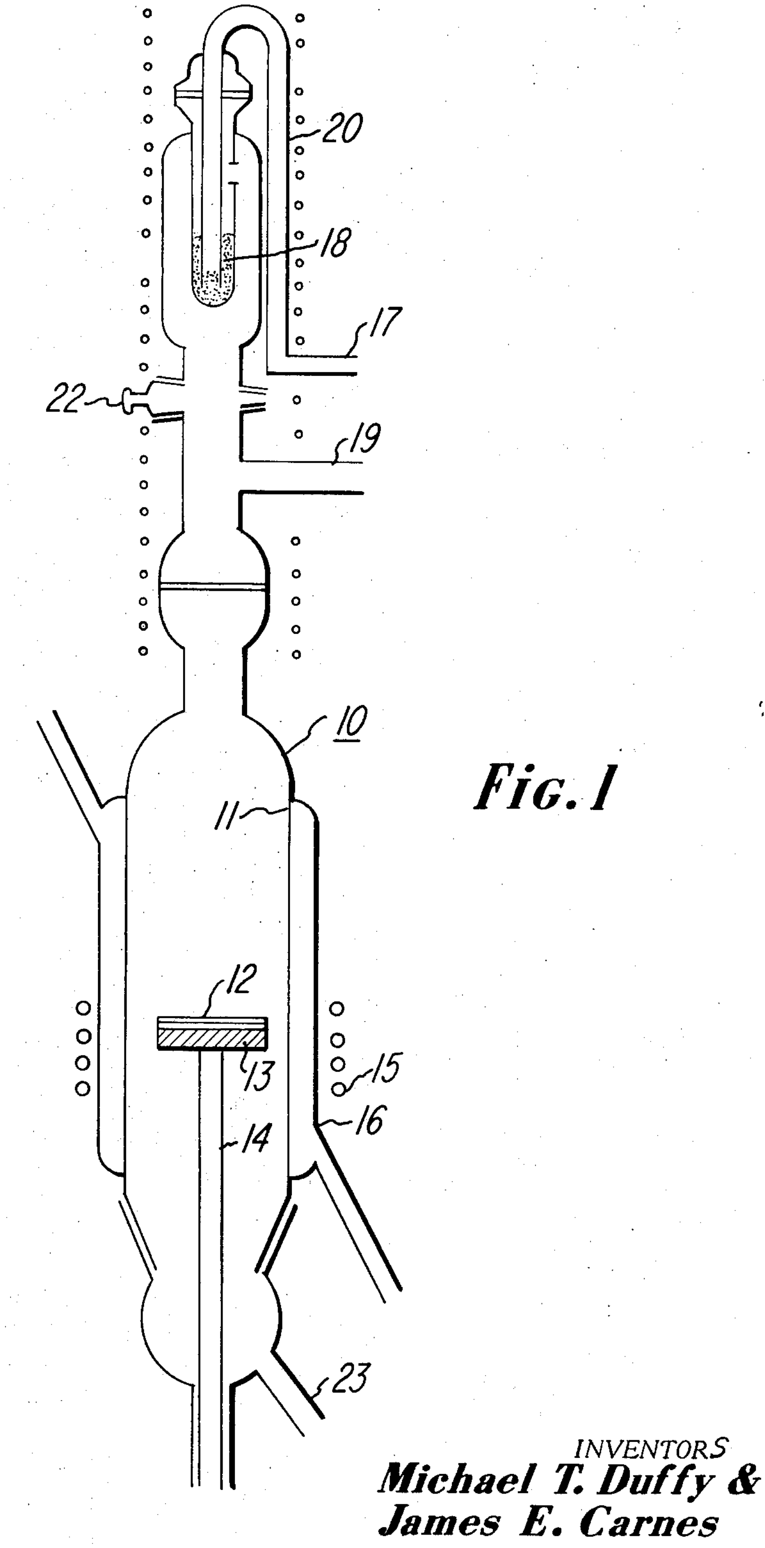
FIG. 1 is a cross-sectional view of an apparatus for thin film deposition of aluminum oxide with provision for introducing hydrogen halide and other gases into the reaction chamber.
Figure 2:
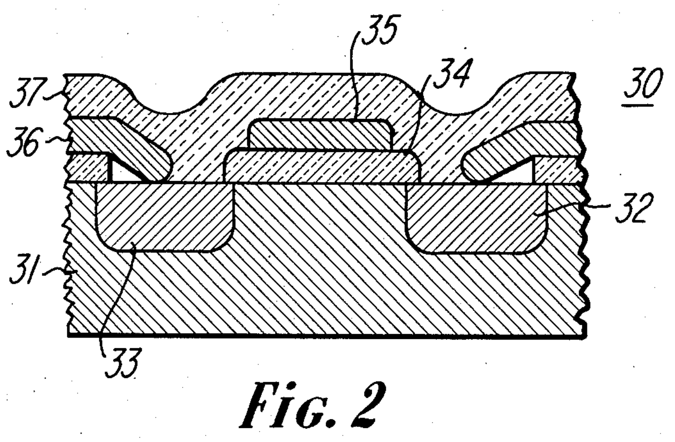
FIG. 2 is a partial cross-sectional view of a bulk-type semiconductor device with an aluminum oxide passivating film deposited by the present improved method.
Figure 3:
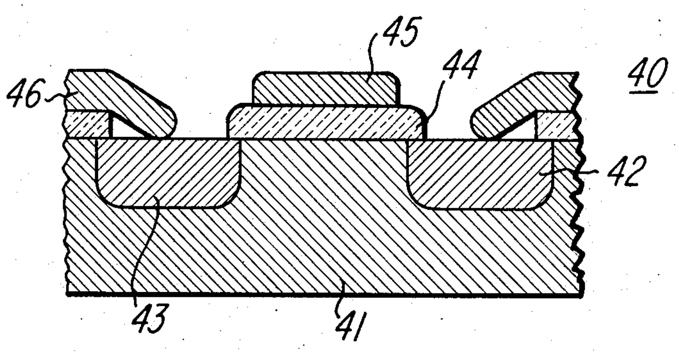
FIG. 3 is a partial cross-sectional view of a bulk-type semiconductor device with an aluminum oxide gate insulator deposited by the present improved method.

In the preferred forms of the method, chemical vapor deposition of $Al_2O_3$ may be achieved by the use of a conventional apparatus such as that shown at 10 in FIG. 1 and may result in articles such as those shown in FIGS. 2 and 3. The apparatus 10 has a reaction chamber 11 in which the substrate 12 is placed on a susceptor 13. The susceptor 13, which is rotatable through a shaft 14, is heated by means of an R-F coil 15, while the walls of the reaction chamber 11 are simultaneously cooled through a water jacket 16. As shown, the upper portion of the apparatus is a generator designed for the production of the vaporous product used in the deposition. To this end, an inert gas is introduced through a port 17 and bubbles through or carries over the vapor phase of an aluminum-containing organic compound 18 contained within a suitable vessel. The apparatus is so constructed that the vaporous product from the organic compound 18 may join with other gases introduced through a port 19. To facilitate the deposition, the apparatus has a heating mantle 20 to maintain the temperature of organic compound 18 and also has a stopcock 22 for isolating the upper generator from the reaction chamber 11. Excess gases are eliminated from the apparatus through an exhaust port 23.

The chemical vapor deposition occurs when the vaporous product formed in the generator by the introduction of an inert gas at port 17 transports the vapor phase of the aluminum-containing organic compound 18 to the reaction chamber 11. The vaporous product mixed with other gases, including a hydrogen halide introduced at port 19, then impinges upon the substrate 12 which is heated by susceptor 13. The compound 18 is decomposed by the heat, leaving free aluminum which reacts with the oxygen present to form $Al_2O_3$, which then deposits on the surface of the substrate 12. While the addition of a hydrogen halide to the atmosphere supporting the reaction is hereinafter demonstrated as having a beneficial effect, the details of the mechanism of the reaction are not known.

The amount of hydrogen halide gas introduced into the chamber is not critical. Even a trace of hydrogen chloride gas, for example, will improve the aluminum oxide film. However, an amount of hydrogen chloride beyond about 5 percent by volume has a deleterious effect on the deposition. The optimum control point for the HCl gas is approximately 1 percent by volume. Also, the volume of aluminum-containing organic compound, such as aluminum isopropoxide, up to about 2 percent will produce satisfactory films. The preferable level for ease of reaction control is approximately 0.2 percent by volume. While it is recognized that the vaporous product from one aluminum-containing organic compound to another will vary to some extent, the range of 0.1 percent to 2 percent by volume encompasses the desired range for both the metal alcoholates and the organo-aluminum compounds. Similarly, the 0.2 value represents the desired level for ease of control for reaction for both subcategories.

EXAMPLE I

In the first example of the preferred embodiments, a vapor of aluminum isopropoxide is transported to the R-F heated substrate 12 by bubbling helium, introduced through port 17, through the aluminum isopropoxide maintained at 125° to 130° C. by the heating mantle 20. The vaporous product formed by bubbling helium through aluminum isopropoxide is subsequently mixed with a nitrogen diluent gas and a helium and hydrogen chloride gas mixture, all of which are introduced at port 19. The aluminum isopropoxide vapors in this gaseous mixture are then pyrolyzed in the presence of the HCl gas at the heated substrate 12 where the susceptor temperature is maintained between about 400° and about 500° C. Using the same material as described in this example, $Al_2O_3$ deposition will occur at temperature as low as 295° and at temperature as high as 600° C. The deposited $Al_2O_3$ film thickness may be controlled by two means—controlling the rate of flow of helium through the aluminum isopropoxide and by controlling the time of exposure of the substrate to aluminum isopropoxide vapors in the reaction chamber. By these means the film thickness may be varied from a few hundred to several thousand angstroms.

EXAMPLE II

In another example of the preferred embodiments, a vapor of trimethyl aluminum is transported to the R-F heated substrate 12 by bubbling helium, introduced through port 17, through the trimethyl aluminium maintained at 125° to 130° C. by the heating mantle 20. The vaporous product formed by bubbling helium through trimethyl aluminum is subsequently mixed with a nitrogen diluent gas, an oxygen-containing gas, and a helium and hydrogen chloride gas mixture, all of which are introduced at the port 19. The trimethyl aluminum vapors in this gaseous mixture are broken down and the aluminum reacts with the oxygen in the presence of HCl gas at the heated substrate 12 where the susceptor 13 temperature is generally maintained between about 400° and about 500° C. The resulting $Al_2O_3$ deposits on the surface of the substrate 12. As in Example I, affective deposition may be accomplished at substrate temperatures between 295° and 600° C. The film thickness may be controlled in the same manner as described in Example I.

As stated above, the present films are useful as passivating materials or as gate insulators of IGFET's. Referring now to FIG. 2, a bulk-type IGFET 30 is shown. It is constructed on an *n* type silicon substrate 31 with areas 32 and 33 used as its source and its drain. These areas are produced using well-known diffusion techniques and are of conductivity type (*p* type in the example of FIG. 2) opposite to that of the substrate 31 into which they are diffused. A layer of insulation on the surface between the source and drain areas provides a gate insulator 34. Metallizaton 35 and 36 (diagrammatically shown) is applied in known manner for gate metallization and connection purposes. A layer of aluminum oxide 37 deposited over the metallized upper surface of the device by the method hereinbefore described passivates the device.

It should be noted that in IGFET on bulk silicon is utilized merely as an example herein, but that the use of the aluminum oxide process of this invention is applicable to passivation of numerous electronic articles.

Referring now to FIG. 3, a partial view of a bulk-type IGFET 40 is shown. It is constructed on an *n* type silicon substrate 41 with diffused *p* type areas 42 and 43 used as its source and its drain. A layer of $Al_2O_3$ produced by the method hereinbefore described is disposed on the surface of the substrate 41 between the source and drain areas and provides a gate insulator 44. Metallization 45 and 46 (diagrammatically shown) is applied for gate metallization and connection purposes.

It should be noted that an IGFET on bulk silicon is utilized merely as an example herein, but that the use of the aluminum oxide process of this invention is applicable to gate insulation of numerous transistor types.

While this deposition process is suitable for electronic articles having almost any substrate, including sapphire, spinel, silicon, germanium, gallium arsenide, and gallium phosphide, in the specific embodiments, described herein, an electronic article having a silicon substrate is shown.

A number of electrical measurements attest to the improvement of the depositions in the presence of hydrogen chloride gas, over deposition of $Al_2O_3$ layers formed by currently available techniques. Surprising results were obtained by capacitance-voltage (C-V), self-healing breakdown, and loss tangent measurments.

Figure 4:
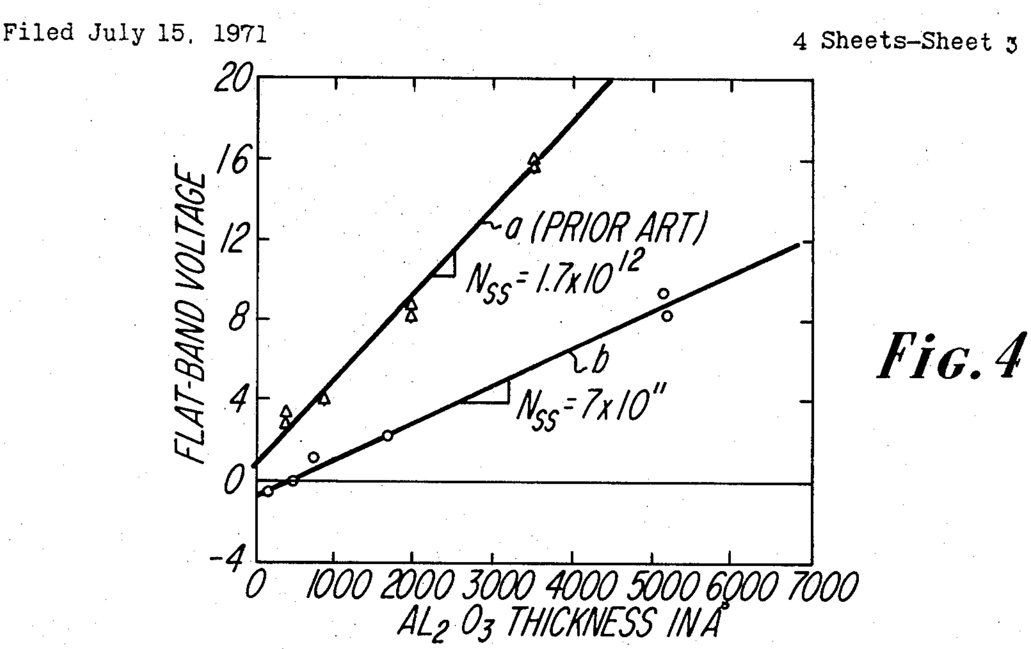
FIG. 4 is a plot of flat band voltage vs. $Al_2O_3$ thickness. Graph (a) represents the prior art, e.g. $Al_2O_3$ grown at 500° C. with $O_2$, Au gates; and Graph (b) characterizes $Al_2O_3$ grown at 500° C. with HCl, Al gates.
Figure 5A:
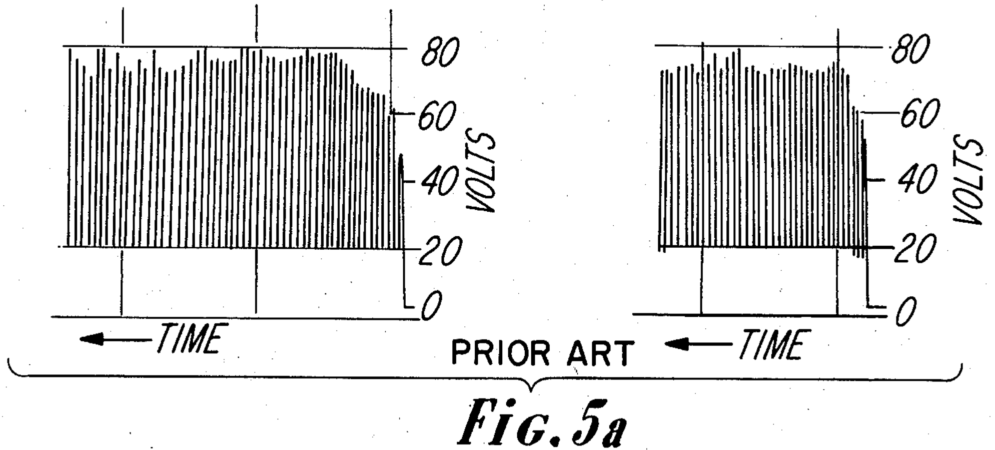
Figure 5B:
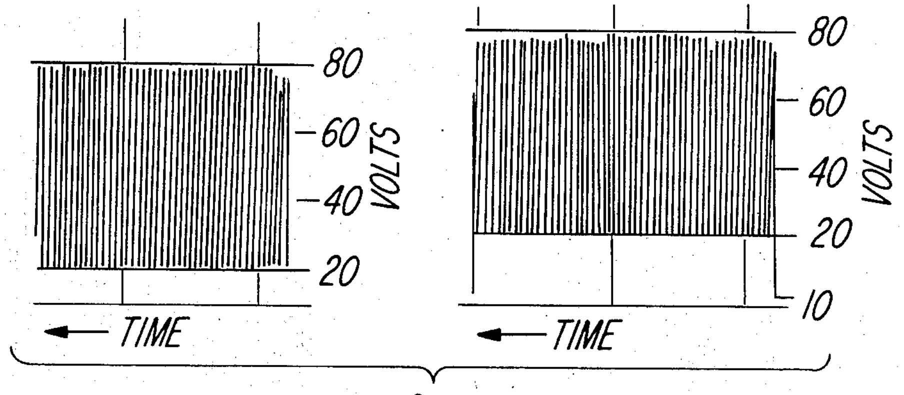

The flat-band voltage is one of the important characteristics of a metal-insulator-silicon system easily obtained from a C-V plot, see FIG. 4. As is known, the flat-band voltage ($V_{fb}$) is that gate voltage which causes the electric field in the Si at the Si-insulator interface to be zero, resulting in disappearance of band bending at the Si surface. The C-V plots obtained for metal-$Al_2O_3$-Si capacitors are similar in most respects to those obtained using $SiO_2$. One of the basic differences, however, is a positive rather than a negative $V_{fb}$. The magnitude of the positive $V_{fb}$ is relatively large, typically 2 to 4 v. for Al gates on 1000 A. films.

In the measurements shown in FIG. 4 the distinctions of flat-band voltage measurements of aluminum oxide deposited by the present invention and by the prior art are shown. Graph *a* in FIG. 4 represents the prior art where $Al_2O_3$ is deposited from 500° C. in the presence of $O_2$ and where Au gates are deposited on the layer thus formed. Graph *b* shows the present invention with $Al_2O_3$ deposited at 500° C. in the presence of HCl and with Al gate metallization. The slopes of the graphs indicate the surface state charge at the Si/$Al_2O_3$ interface with values of $1.7\times10^{12}$ charges/cm.$^2$ for the prior art and $7\times10^{11}$ charges/cm.$^2$ for the present invention. The 1.3 v. difference between the two *y*-axis intercepts reflects the difference in work functions for Au (5.3) and Al (4.2).

Perhaps the most remarkable of the differences in the material produced by the present method of depositing $Al_2O_3$ and that of the prior art is revealed by self-healing breakdown measurements. Copies of recorded traces for two separate self-healing breakdown tests for $Al_2O_3$ films deposited without HCl are shown in FIG. *5a*. FIG. *5b* characterizes $Al_2O_3$ deposited in the presence of HCl, for two samples. The initial breakdown phenomenon has been treated at length in N. Klein's "Electrical Breakdown in Solids," in Advances in Electronics and Electronic Physics, Vol. 26 (Academic Press, New York; 1969), particularly the section entitled "Breakdown in Insulators," pages 359–419.

The technique used herein involves the use of a thin (≤1000 A.) metal electrode on a thin (≤10,000 A.) dielectric film. Upon the application of a voltage across the film and upon the occurrence of a breakdown at some localized weak spot, the thin metal electrode is removed from the spot of breakdown by the explosive action of the breakdown event. The removal of the metal effectively opens the circuit and the breakdown current flow stops, hence the name "self-healing." The damaged area caused by a breakdown event is typically only several microns in diameter so that thousands of self-healing breakdown events can occur in a particular test site. The self-healing breakdown test reveals the initial or weakest spot in the deposited film and determines the merit of a dielectric for device application.

A particularly useful method of utilizing self-healing breakdown is the ramp voltage technique, hereafter referred to as the ramp mode. A ramp voltage with variable rise time (1–100 v./sec.) is applied across the sample. The voltage increases until breakdown occurs. The onset of breakdown is sensed electronically by monitoring sample current which is used to fire an SCR, returning the sample voltage to zero. When the voltage drops below the holding voltage of the SCR, another ramp sequence begins. Only one breakdown event occurs per sequence. The voltage across the sample is recorded on a chart recorder producing traces as shown in FIGS. *5a* and *5b*. In these figures time increases to the left. The breakdown voltage at each successive breakdown event (represented by the top of each vertical line in the trace) generally increases as weak spots are sequentially removed by the self-healing breakdown action. The fact that each peak of the trace always corresponds to only one breakdown can be verified by observing the breakdown events with a high power microscope.

As seen in FIG. *5a,* the initial breakdown voltage for the prior art dielectric is shown on the right-hand side of each of the graphs and is about ⅔ of the final breakdown voltage. After determining the initial value the average of the peaks of the recorder traces represents the "intrinsic" or final breakdown strength of the dielectric.

Remarkably, it was found that the only effective technique for eliminating the low initial breakdown level of the prior art described above was by depositing $Al_2O_3$ films in the presence of hydrogen halide gas, such as HCl. The effect of HCl gas during deposition is not merely a substrate surface cleaning effect, as those tests performed with HCl present only before deposition produced results very similar to the prior art. In the practice of the present invention, the initial breakdown voltage level as seen in FIG. *5b* for samples of 1000 A. of $Al_2O_3$ with Au gates is between 75 and 78 v., whereas similar measurements on otherwise identical samples prepared by the prior art show initial breakdown levels of approximately 52 v. Another effect of the HCl present during deposition, in addition to the initial breakdown level, is that the intrinsic breakdown value is apparently more consistent. In both samples shown in FIG. *5b,* all the recorded traces fall between 70 and 79 v. In the prior art, even after building up to the intrinsic value of approximately 70 v., several occurrences of breakdown below that level occur and the excursions between successive breakdown measurements are greater.

The effect of varying $Al_2O_3$ deposition parameters such as deposition temperature ($T_d$) and ambient gases upon the final breakdown field was also studied. The deposition temperature was varied between 400° and 600° C. and rather large variations in breakdown strengths were observed as seen in FIG. 6, curve *a*. However, if HCl gas was present during the deposition, no large effect was observed between 400° and 520° C., curve *b*.

For loss tangent measurements, the capacitance and conductance were obtained with a Boonton electronics direct capacitance bridge (Model 75C–S13, Boonton, N.J.), over a frequency range from 5 to 500 kHz. The measurements were made on MAS structures with *p* type silicon substrates, with zero gate bias. Because of the negative fixed oxide charge at the Si-$Al_2O_3$ interface, the surface of *p* type substrates is normally in accumulation at zero gate bias, so that all of the applied voltage appears across the dielectric. These measurements permit the calculation of loss tangent (tan $\delta$) for the $Al_2O_3$ films. This quantity, which measures the ratio of the energy lost in the oxide per AC cycle to the energy stored in the dielectric in the form of the electric field, is generally accepted as a sensitive measure of the quality of the dielectric. Tan $\delta$ was evaluated for two series of samples. All had *p* type substrates and Al gates. Each set consisted of eight wafers each with $Al_2O_3$ deposited at different temperatures varying between 400° and 520° C. One set was deposited without HCl present during deposition, the other with HCl. The data in Table I was then taken over the 5 to 500 kHz. range and maximum and minimum values for each set of eight wafers were determined. At low deposition temperatures (below 450° C.), the tan $\delta$ measurements for those wafers deposited without HCl are approximately one order of magnitude greater than those deposited with HCl, but the former approaches the HCl values above 450° C. The data indicate that the presence of HCl during deposition favorably affects the quality in terms of loss tangent, and substantially produces $Al_2O_3$ films over the measured frequency range with tan $\delta$ values of less than 0.0100.

TABLE I

| Frequency (kHz.) | With HCl Min. | With HCl Max. | No HCl Min. | No HCl Max. |
|---|---|---|---|---|
| 5 | 0.0022 | 0.0032 | 0.0032 | 0.053 |
| 10 | 0.0022 | 0.0033 | 0.0033 | 0.052 |
| 30 | 0.0024 | 0.0039 | 0.0038 | 0.063 |
| 50 | 0.0027 | 0.0040 | 0.0040 | 0.068 |
| 70 | 0.0027 | 0.0042 | 0.0040 | 0.074 |
| 100 | 0.0035 | 0.0050 | 0.0052 | 0.080 |
| 300 | 0.0050 | 0.0068 | 0.0062 | 0.090 |
| 500 | 0.0070 | 0.0103 | 0.0076 | 0.110 |

It should be understood that while the foregoing discussion makes specific references to the fabrication of MIS and MOS devices, the principles of the present invention are also applicable to the fabrication of other electronic articles, such as bipolar transistors and integrated circuits.

We claim:

1. A method of forming a layer of aluminum oxide in the manufacture of an electronic article comprising the steps of:

providing a surface on said electronic article; and forming on said surface a layer of aluminum oxide by chemical vapor deposition from the pyrolysis in the vapor phase of an aluminum-containing organic compound selected from the group consisting of an aluminum alcoholate compound, an aluminum trialkyl compound, and a dialkyl aluminum alkoxide compound in a gaseous atmosphere comprising from a trace amount up to 5% by volume of hydrogen chloride; and a sufficient amount of oxygen for the reaction of said compound to said oxide.

2. A method according to claim 1, wherein said surface is a surface of a single crystal silicon body having at least one active semiconductor site.

3. A method according to claim 1, wherein said aluminum-containing organic compound is selected from the group consisting of aluminum trialkyl compounds and a dialkyl aluminum alkoxide compound and wherein said oxygen is introduced into said gaseous atmosphere.

4. A method according to claim 3, wherein said chemical vapor deposition occurs in an atmosphere consisting essentially of inert gases.

5. A method according to claim 3, wherein said compound is trimethyl aluminum.

6. A method according to claim 5, wherein said chemical vapor deposition is by the impingement of a vaporous product, formed by bubbling an inert gas through molten trimethyl aluminum, upon said substrate surface at a temperature of about 295° to about 600° C.

7. A method according to claim 6, wherein said vaporous product consists essentially of from 0.1 to 2 percent by volume of trimethyl aluminum and sufficient oxygen for reaction, and the balance of inert gas.

8. A method according to claim 1, wherein said aluminum-containing organic compound is an aluminum alcoholate compound and wherein the organic moiety contains oxygen and the pyrolysis thereof provides oxygen for the reaction.

9. A method according to claim 8, wherein said aluminum alcoholate compound is selected from the group consisting of aluminum isopropoxide, aluminum ethoxide, aluminum butoxide, aluminum methoxide, aluminum phenoxide, aluminum acetylacetonate, aluminum 2-ethylhexoxide, and aluminum cyclohexanebutyrate.

10. A method according to claim 9, wherein said chemical vapor deposition is by the pyrolysis of aluminum isopropoxide.

11. A method according to claim 10, wherein said pyrolysis occurs in an atmosphere consisting essentially of inert gases and up to 5 percent by volume of hydrogen chloride.

12. A method according to claim 10, wherein said pyrolysis is by the impingement of a vaporous product, formed by bubbling inert gas through molten aluminum isopropoxide, upon said surface at a temperature of about 295° to about 600° C.

13. A method according to claim 12, wherein said vaporous product consists essentially of from 0.1 to 2 percent by volume of aluminum isopropoxide and the balance of inert gas.

References Cited

UNITED STATES PATENTS

| | | | |
|---|---|---|---|
| 2,805,965 | 9/1957 | Robinson | 117—221 |
| 3,373,051 | 3/1968 | Chu et al. | 117—106 R |
| 3,386,163 | 6/1968 | Brennemann et al. | 317—235/46.5 |
| 3,502,502 | 3/1970 | Elsby | 117—106 R |
| 3,511,703 | 5/1970 | Peterson | 117—106 R |

CAMERON K. WEIFFENBACH, Primary Examiner

U.S. Cl. X.R.

117—106 R; 317—235 AG; 317—235/46.5